United States Patent

[11] 3,619,421

[72] Inventors Millice Floyd Hobbs
 Monte Sereno;
 Rayburn W. Prettyman, San Jose; John H. Blake, Portola Valley; Robert A. Fisher, Los Gatos, all of Calif.
[21] Appl. No. 795,704
[22] Filed Jan. 31, 1969
[45] Patented Nov. 9, 1971
[73] Assignee FMC Corporation

[54] SEWAGE TREATMENT PROCESS AND APPARATUS
11 Claims, No Drawings
[52] U.S. Cl. .................................................. 210/7, 210/14, 210/220, 261/124
[51] Int. Cl. .................................................. C02c 1/12
[50] Field of Search .................................................. 261/124; 210/3–8, 14, 15, 220

[56] References Cited
UNITED STATES PATENTS

| | | | |
|---|---|---|---|
| 1,247,540 | 11/1917 | Jones | 210/14 |
| 3,347,537 | 10/1967 | Morgan | 210/15 X |
| 3,385,444 | 5/1968 | Dufournet | 210/15 X |
| 3,396,102 | 8/1968 | Forrest | 210/15 X |

FOREIGN PATENTS

| | | | |
|---|---|---|---|
| 9,989 | 1915 | Great Britain | 210/220 |
| 415,775 | 9/1934 | Great Britain | 210/220 |

Primary Examiner—Michael Rogers
Attorney—Dressler, Goldsmith, Clement & Gordon

ABSTRACT: The process of this invention deals with the operation of tanks in which sewage is aerated to accomplish homogeneous mixing and fast B.O.D. removal. In the illustrative embodiment, air injection is proportioned so that air dispersers positioned adjacent the effluent side of the aeration tank receive at least 51% of the total air input.

SEWAGE TREATMENT PROCESS AND APPARATUS

This invention relates to an aerobic process for the treatment of aqueous waste materials. More particularly, it relates to control of air dispersion in the aeration tank of a sewage treatment plant using the cross flow arrangement of the activated sludge process to accomplish homogeneous mixing.

In accordance with this invention, liquid mediums, i.e., influent sewage and sludge recycled in accordance with activated sludge sewage treatment practice, are introduced into an aeration zone in positions subject to the effects of tank agitation and are brought to the stage of a homogeneous mixture, i.e., optimum environmental situation, by positioning at least one row of air dispersing means adjacent the aeration zone wall provided with the means for outflow of effluent suspension and by introducing at least 51% of the gas being introduced for agitation of the mixture through said air dispersers positioned adjacent said aeration zone wall.

In the conventional activated sludge systems in use today, influent sewage generally is introduced at one end of an aeration tank, the so-called plug flow. Means for introducing air extend either longitudinally of the aeration tank or transversely over an appreciable length of a tank. Introduction of large volumes of air creates agitation which induces mixing of the tank contents. Such operations require long tanks to accomplish practical degrees of mixing before any influent sewage traverses the length of the tank and approaches the tank outlet.

This type of treatment has been shown to have a number of drawbacks. Recycling of sludge mixes aerobic micro-organisms with influent sewage which makes organic food material available to them. Aeration makes available the supply of oxygen required for activity and growth. The micro-organisms biodegrade organic material and tend to deplete oxygen in localized areas of the aeration tank. When using plug flow and air dispersers extending longitudinally of an aeration tank which is long relative to width in a manner creating, for example, a spiral flow pattern, agitation and liquid velocities in certain areas of the tank are insufficient to keep influent organic food supply and micro-organisms in uniform admixture, this being a condition which is necessary for relatively rapid and complete B.O.D. removal.

Further, under such plug flow conditions, the micro-organisms receive the full impact of any shock load and respond with sudden increases in oxygen demand and growth. Thus, the active micro-organisms content of the aeration tank is subject to continual shifting and never approaches a relatively steady state condition.

When the conventional aeration systems are retained and the direction of liquid flow in the aeration tank is changed, for example, from lengthwise to widthwise so that the influent sewage enters at the wall having air dispersers adjacent thereto, i.e., to the so-called cross flow system wherein, for example, there is relatively uniform distribution of influent material along one longitudinal side of an aeration tank and relatively uniform collection of effluent along an opposite longitudinal wall, a serious problem of short-circuiting or abnormally fast wash out of influent sewage and recycle sludge has been encountered, a defect which markedly reduces the effectiveness of the treatment of waste materials.

By short-circuiting, we mean that the stream of material being introduced into the aeration tank instead of becoming uniformly distributed in the contents of the tank, tends to form identifiable constricted regions and often follow more or less direct paths across the tank from inlet to effluent outlet.

Studies of such tanks using tracer elements and velocity measuring devices clearly establish two types of areas in the tanks which must be avoided in order to have adequate B.O.D. removal, i.e., areas of weak agitation and areas where liquid velocity is so low as often to be deemed a "dead spot."

A typical tracer operation may be conducted by the use of salt brine in place of influent sewage or in place of recycle sludge in typical sewage treatment tanks of about 14 foot liquid depth which have influent ports positioned on 22 foot centers and effluent ports spaced on 4 foot centers. In such a tank, air dispersers, such as cord wound tubes or porous, flexible media diffusers, are positioned a distance of two feet above the floor and on 6 to 12 inch centers so that air may be introduced over a 22 foot length of tank by 87 tubes arranged on both sides of an air header each capable of discharging 5 to 10 c.f.m., along the inlet side longitudinal wall.

In such a salt tracer test, sodium chloride content of liquid samples obtained at the outlet ports, may be determined by a conductivity meter such as a Leeds and Northrup Conductivity Cell No. 589.

When the salt solution is first introduced as an influent stream into tanks originally designed for plug flow but modified to provide the so-called cross flow of liquid, i.e., with an aeration header along the wall at which influent material is introduced, it takes less than 30 seconds for appreciable salt content to appear in the effluent samples. Generally after about 30 seconds, there is an initial surge of salt content showing short circuiting following which the salt content of the effluents taper off to substantially equal salt content in all the effluent streams. For example, in a tank of 22 foot length, 22 foot width and 14 foot liquid depth aerated by 700 c.f.m. of air, fed 57.1 c.f.m. of water as influent feed, 43.1 c.f.m. of water in lieu of recycle sludge and having a saturated salt solution introduced 6 feet from and at equidistant points along the longitudinal wall at which the influent feed is introduced, 30 seconds after introducing the salt solution, the effluent from the outlet ports may show, for example, from 500 to 666 mg. per liter of chloride content which then tapers off in about 20 minutes to about 210 mg. per liter content from all ports.

If a like set of diffusers are disposed on the effluent as well as the influent side of a tank such as was described previously, and an air input of about equal volumes are introduced through each set of diffusers, this arrangement likewise takes less than 30 seconds for appreciable salt content to appear in the effluent samples and generally after about 30 seconds, there is a surge of salt content. Although the surge is slightly less pronounced than that shown with the single set of diffusers, it nevertheless is evidence of short circuiting. Following this surge, the salt contents of the effluents taper off to substantially equal salt contents in all the effluent streams. For example, when salt solution is introduced as described previously, 30 seconds after introducing the salt solution, the effluent from the outlet ports may show, for example, variation from 118 to 424 mg. per liter of chloride content. In about 20 minutes the salt distribution becomes such as to provide about 240 mg. per liter from all of the effluent ports.

Fluorescein dye can be substituted for salt or incorporated into salt solutions used in aeration pattern studies to observe visually the mixing characteristics of a tank and the stream flow patterns, i.e., tendencies for short-circuiting of the liquid flow.

What is being observed in Fluorescein dye tests can be demonstrated by velocity tests, i.e., rate of flow of liquid in various areas of a tank using such apparatus as a Khalsico Universal Current Meter with a number 3 propeller. Velocity can be determined at the surface and deep in the tank at any vertical axial position such as the center as regards the inlet and outlet sides of the tank.

When air is introduced into a tank having air dispersers on opposite sides of the tank, in approximately equal quantities, it has been observed and determined by velocity that slightly above the level of the air dispersers and in a position centrally located between the perimeter lines of the effective width of the diffusion bands created by the diffusers, the velocity of the liquid is so low as to constitute a dead spot, i.e., less than about 0.3 feet per second.

Now it has been discovered that sewage treatment tanks operating on the crossflow principle can be adapted to achieve homogeneous mixing of influent aqueous mediums into the contents of an aeration zone when the process comprises establishing an aqueous medium in a holding zone, i.e., aeration zone, introducing influent aqueous medium in areas spaced from the aeration zone wall provided with the means for outflow of liquid medium, for example, suspensions or mixed liquor from said aeration zone, introducing gas containing oxygen into said aeration zone at least in areas along and in the vicinity of the wall provided with means for outflow of liquid medium, said introduction of gas being in quantities creating relatively uniform agitation of the liquid along said wall, and in quantities insuring that at least 51% of the total quantity of gas introduced into said aeration zone be introduced in the vicinity of said wall.

In a preferred embodiment involving contiguous rectilinear aeration and settling tanks, said aeration tank operating on the crossflow principle can be adapted to achieve homogeneous mixing of influent aqueous medium into the contents of an aeration zone with influent aqueous medium being introduced with relatively uniform distribution along one side of said aeration zone and effluent being discharged in relatively uniform quantities along the opposite side of said aeration zone when the process comprises establishing an aqueous medium in a holding zone, i.e., aeration zone, introducing influent aqueous medium along one side of said aeration zone, introducing gas containing oxygen into said aeration zone at least along and in the vicinity of said opposite side of said aeration zone, said introduction of gas being in quantities relatively uniformly distributed along said opposite longitudinal side and apportioning the gas introduction to insure that at least 51% of the total quantity of gas required for aeration is introduced along said opposite longitudinal side of said aeration zone.

The apparatus to carry out such a method of operation comprises a tank for a liquid medium having lateral sides and a bottom, means for introducing influent aqueous medium with relatively uniform distribution along a longitudinal side of said tank, means for discharging an aerated mixture with relatively uniform discharge along the opposite longitudinal side of said tank, gas dispersing means spaced from the bottom of said tank, said gas dispersing means consisting of at least one series of spaced units adapted to discharge gas in bubble form arranged in a row along said opposite longitudinal side of said tank and control means to direct at least 51% of the total volume of gas containing oxygen through said series of spaced units arranged along said opposite longitudinal side of said tank.

A necessary requirement for dissemination of influent material throughout the tank contents is that the introduction of gas creates strong agitation. The more uniform the distribution of gas, for example, along said outlet wall, the better the mixing. When more than one row of dispersers are positioned in the aeration tank, the dispersers positioned along the wall provided with liquid outlets, must introduce at least 51% of the gas being dispersed in the aeration tank. Where the aeration tank is provided with more than one row of dispersers, the independent rows may be provided with gas under pressure from a single source or from independent sources. In the event that the volume of gas required for agitation is in excess of the volume of oxygen-containing gas needed to satisfy B.O.D. requirements, the gas supply may be supplemented by nonoxygen containing gas, for example supplied to one or more sets of the dispersers form a source where such gas is maintained under pressure. Irrespective of the volume of oxygen containing gas, the volume of gas dispersed along the wall provided with liquid outlets, must be at least 51% of the total volume of gas being discharged into the liquid in the aeration tank.

A necessary requirement for producing a homogeneous mixture in the aeration tank or zone is that the agitation created by introduction of gas causes liquid flow at and near the liquid surface which is directed away from the adjacent wall provided with liquid outlets and that such agitation extend, for example, more or less continuously along the full length of the corssflow aeration tank on the effluent side thereof. To accomplish this result, it is preferred that dispersers capable of discharging the same number of cubic feet of gas per minute be substantially equidistantly spaced along the so-called effluent side of the aeration zone, although such dispersers can be positioned as spaced groups of air discharging elements.

This flow at the surface countercurrent to the general direction of flow through the tank prevents short-circuiting and forces the influent materials to move downwardly and mix with the tank contents before traveling to the vicinity of the effluent outlets.

When more than one row of dispersing means are positioned in an aeration zone adapted for crossflow operation, it is necessary that one of the rows of dispersing means be adjacent the effluent wall and that at least 51% of the total volume of gas being introduced into the mixed liquor be dispersed through the dispersing means adjacent the effluent wall so as to maintain a flow adjacent the surface generally in the direction of the influent wall.

If the amount of gas containing oxygen being introduced along the effluent wall is in excess of 51% of the total volume of gas being used to aerate the mixed liquor, an aeration tank will exhibit a minimum of short-circuiting and can be operated at loadings from about 3 to 5 times the loadings of conventional plug-flow activated sludge systems.

While the previous discussion has dealt with the positioning of one or two rows of gas dispersion means, a greater number of rows of gas dispersion means can be used so long as the gas input is proportioned to introduce at least 51% of the total gas input through the dispersing means adjacent the effluent wall.

The invention will be further understood from the description in the following examples which had as the criterion of the ability to give a homogeneously mixed aeration tank with a 24 hour loading factor in the range of 100 to 165 pounds of B.O.D. per 1,000 cubic feet of aeration tank capacity when introducing sewage of about 200 to 220 mg. per liter of B.O.D. and air requirement of 900 cubic feet for each pound of B.O.D. removed.

EXAMPLE I

An aeration tank, which was 22 feet square and had a liquid operating depth of 14 feet, was provided with two 5 inch diameter gas headers which were positioned parallel to and approximately 2 feet 6 inches from the adjacent wall and have threaded diffuser lateral outlets. The threaded diffuser outlets support sock type gas dispersers of approximately 2 feet length and 3 inches internal diameter and conduct gas to the interior of said flexible porous plastic socks forming a so-called wide band dispersion pattern.

The dispersers were attached to the headers and were mounted in two groups on 12 inch centers. The group positioned adjacent to the influent wall consisted of 21 dispersers and the group extending from a line parallel to and about 2 feet 6 inches from the influent wall consisted of 22 dispersers. The group positioned adjacent the effluent wall, which was provided with five ports for discharging aerated mixed liquor from the tank, consisted of 22 dispersers and the group extending from a line parallel to and about 2 feet 6 inches from the effluent wall consisted of 21 dispersers.

Influent aqueous medium was introduced into the tank at a flow rate of approximately 423 g.p.m. Aqueous medium was introduced into the tank to simulate recycle of return sludge at a flow rate of approximately 340 g.p.m., i.e., a rate equal to 80% of the incoming simulated sewage flow.

Air from centrifugal blowers was introduced through the dispersers to provide a total of 430 c.f.m., the air being proportioned between the headers so that 210 c.f.m. was introduced through the dispersers adjacent to the influent side of the tank, and 220 c.f.m. was introduced through the dispersers adjacent to the effluent side of the tank (approximately 51% of the total air.)

Salt washout tests were conducted by introducing 120 gallons of saturated brine (50 pounds of sodium chloride) into the tank at four points evenly spaced across the length of the tank and 6 feet from the influent side of the tank.

A theoretical half-life for the salt tracer under the above conditions is $$T\tfrac{1}{2} = \frac{0.693 \times V}{Q + RQ}$$

wherein V is the tank volume and R describes the return sludge flow as the decimal equivalent of the influent waste flow Q. When the actual washout half-life is 90% or better of theoretical, the tank contents are being adequately mixed for homogeneity.

Actual half-life measured at ports 2 and 4 of 42.9 minutes and 45.9 minutes, when compared to a theoretical half-life of 48.3 minutes indicates an average efficiency of 92% and, therefore, good mixing.

EXAMPLE II

The tank, diffuser arrangement and flow of aqueous mediums were maintained the same as in example I.

The air dispersed was also a total of 430 c.f.m. but the air input was proportioned to introduce 320 c.f.m. at the effluent side of the tank (approximately 74.5% of the total air) and 110 c.f.m. at the influent side of the tank.

Salt washout tests were conducted in the same manner as in example I.

Actual half-life measured at ports 2 and 4 of 48.1 minutes and 46.8 minutes, when compared to a theoretical half-life of 47.6 minutes, indicates an average efficiency of 100% and, therefore, excellent mixing.

EXAMPLE III

The tank, diffuser arrangement and flow of aqueous mediums were maintained the same as in example I.

The air dispersed was changed to increase the total input to 710 c.f.m., with the air input proportioned to introduce 470 c.f.m. at the effluent side of the tank (approximately 68% of the total air) and 230 c.f.m. at the influent side of the tank.

Salt washout tests were conducted in the same manner as in example I.

Actual half-life measured at ports 2 and 4 of 44.8 minutes and 44.9 minutes, when compared to a theoretical half-life of 47.9 minutes, indicates an average efficiency of 94% and, therefore, good mixing.

EXAMPLE IV

The tank, diffuser arrangement and flow of aqueous mediums were maintained the same as in example I.

The air dispersed was changed to increase the total input to 705 c.f.m., with the air input proportioned to introduce 525 c.f.m. at the effluent side of the tank (approximately 75% of the total air) and 180 c.f.m. at the influent side of the tank.

Salt washout tests were conducted in the same manner as in example I.

Actual half-life measured at ports 2 and 4 of 42 minutes and 44.9 minutes, when compared to a theoretical half-life of 47.9 minutes, indicates an average efficiency of 91% and, therefore, good mixing.

EXAMPLE V

The apparatus described in example I was revised to have one set of dispersers adjacent the effluent side of the tank and the other in the approximate center of the tank.

The volume flow of aqueous mediums through the tank were the same as in example I.

The total 695 c.f.m. of air from the centrifugal blower was proportioned between the headers so that 465 c.f.m. was introduced through the dispersers adjacent the effluent side of the tank (approximately 66% of the total air) and 230 c.f.m. was introduced through the dispersers in the center of the tank.

Salt washout tests were conducted in the same manner as in example I.

Actual half-life measured at ports 2 and 4 of 49.8 minutes and 42.1 minutes, when compared to a theoretical half-life of 47.6 minutes indicates an average efficiency of 91% and, therefore, good mixing.

EXAMPLE VI

An aeration tank which is 30 feet in diameter and has a liquid operating depth of 14 feet may be provided with a plurality of gas headers of 5 inch diameter and 6 foot length spaced circumferentially along the interior of the perimeter wall of the tank. Each header, for example, is positioned out from the perimeter wall of the tank a distance to permit a sock type disperser of the type described in example I to extend horizontally its full length at right angles to the header without contacting the wall. Headers are provided with five pairs of threaded diffuser lateral outlets positioned on approximately 18 inch centers. The pairs of outlets support sock type gas dispersers so that when gas is being discharged, the diffusers so that when gas is being discharged, the diffusers extend substantially horizontally to form a dispersion band extending out approximately 5 feet from the outlet wall. The tank may also be provided with gas dispersing means at the bottom center thereof for agitation purposes.

Such a circular tank may be provided with outlets generally positioned on about 6 foot centers, i.e., 15 outlets to a 30 foot diameter tank.

Influent sewage is introduced into such a tank at its vertical axial center, generally at or near the surface. Return sludge is introduced generally at spaced points intermediate the axial center and the perimeter wall or by overflowing the weir of circular trough of 10 foot diameter positioned concentric to the vertical axis of the tank.

Based upon a 2.8 hour aeration period, when 440 g.p.m. of sewage of 250 mg. of B.O.D. per liter, 440 g.p.m. of return sludge and 900 SCF of air per pound of B.O.D. are being introduced into the tank and the dispersers adjacent the perimeter wall are discharging 825 s.c.f.m. of the 900 s.c.f.m. total, complete mixing and little short circuiting results.

The half-life, as described in example I for the sludge when the tank operates under the above set forth conditions is T1/2=1.94 hours for sewage alone and T T1/2=0.97 hours for sewage plus return sludge.

Although the invention has been described in connection with specific embodiments thereof, it will be understood that these are not to be regarded as limitations on the scope of the invention except insofar as included in the accompanying claims.

1. The method of achieving homogeneous mixing of influent aqueous medium into the contents of an aeration zone operating on the crossflow principle which comprises establishing an aqueous medium in said aeration zone, introducing influent aqueous medium with relatively uniform distribution along a longitudinal axis parallel to and spaced from the longitudinally extending aeration zone wall provided with means for outflow of liquid medium, introducing gas containing oxygen into said aeration zone simultaneously in a first area along and in the vicinity of the wall provided with said means for outflow of liquid medium and in at least one other parallel to said first area and spaced therefrom in the direction of introduction of influent aqueous medium, said introduction of gas being in areas spaced from the bottom of said aeration zone and in quantities creating relatively uniform agitation of the liquid along substantially the entire length of said wall provided with means for outflow of liquid medium and in quantities insuring that at least 51% of the total quantity of gas introduced into said aeration zone be introduced in said first area.

2. The method of achieving homogeneous mixing of influent aqueous medium into the contents of an aeration zone operating on the crossflow principle with influent aqueous medium being introduced with relatively uniform distribution along a longitudinal side of said aeration zone and effluent being discharged in relatively uniform quantities along the opposite longitudinal side of said aeration zone which comprises establishing an aqueous medium in said aeration zone, introducing influent aqueous medium along a longitudinal side of said aeration zone, simultaneously introducing gas containing oxygen into said aeration zone along and in the vicinity of said longitudinal sides of said aeration zone, said introduction of gas being in areas spaced from the bottom of said aeration zone and with relatively uniform distribution along said longitudinal sides and controlling the gas introduction to insure that at least 51% of the total quantity of gas required for aeration is introduced along said opposite longitudinal side of said aeration zone.

3. The method according to claim 1 wherein said influent aqueous medium is aqueous sewage and the aqueous sewage and recycle sludge are mixed into the contents of said aeration zone.

4. The method according to claim 2 wherein said introduction of gas is along both said longitudinal side of said aeration zone and said opposite longitudinal side of said aeration zone.

5. The method of achieving homogeneous mixing of influent aqueous medium into the contents of an aeration zone operating on the crossflow principle with influent aqueous medium being introduced with relatively uniform distribution along a longitudinal side of said aeration zone and effluent being discharged in relatively uniform quantities along the opposite longitudinal side of said aeration zone which comprises establishing an aqueous medium in said aeration zone, introducing influent aqueous medium along a longitudinal side of said aeration zone, simultaneously introducing gas containing oxygen into said aeration zone along said opposite longitudinal side of said aeration zone and along an axis parallel to the axis of said area of introduction of gas along said opposite longitudinal side and intermediate said area along said opposite longitudinal side and intermediate said area along said opposite longitudinal side of said aeration zone and said longitudinal side along which influent aqueous medium is introduced and controlling the gas introduction to insure that at least 51% of the total quantity of gas required for aeration is introduced along said opposite longitudinal side of said aeration zone.

6. The method of achieving homogeneous mixing of influent aqueous medium into the contents of an aeration zone operating on the crossflow principle with influent aqueous medium being introduced with relatively uniform distribution along a longitudinal side of said aeration zone and effluent being discharged in relatively uniform quantities along the opposite longitudinal side of said aeration zone which comprises establishing an aqueous medium in said aeration zone, introducing influent aqueous medium along a longitudinal side of said aeration zone, simultaneously introducing gas containing oxygen into said aeration zone along said longitudinal side of said aeration zone, along said opposite longitudinal side of said aeration zone and along a longitudinal axis intermediate the areas of gas introduction along said longitudinal sides, and controlling the gas introduction to insure that at least 51% of the total quantity of gas required for aeration is introduced along said opposite longitudinal side of said aeration zone.

7. Apparatus for production of a homogeneous mixture by rapid dissemination of influent aqueous medium in the liquid contents of an aeration zone operating on the cross flow principle which comprises a tank for a liquid medium having lateral sides and a bottom, means for introducing influent aqueous medium with relatively uniform distribution along a longitudinal side of said tank, means for discharging an aerated mixture with relatively uniform distribution along a longitudinal side of said tank, means for discharging an aerated mixture with relatively uniform discharge along the opposite longitudinal side of said tank, gas dispersing means spaced from the bottom of said tank, said gas dispersing means arranged for simultaneous discharge of gas consisting of one series of spaced units adapted to discharge gas in bubble form arranged in a row along said opposite longitudinal side of said tank and in at least one other area parallel to said first area and spaced therefrom in the direction of introduction of influent aqueous medium, and control means to direct at least 51% of the total volume of gas containing oxygen through said series of spaced units arranged along said opposite longitudinal side of said tank.

8. Apparatus according to claim 7 wherein the influent aqueous medium is aqueous sewage, the liquid content of said tank is mixed liquor and the apparatus includes means for introducing recycle sludge into said tank.

9. Apparatus according to claim 7 wherein said gas dispersing means consists of one series of spaced units positioned along said opposite longitudinal side of said tank and a second series of spaced units positioned along said longitudinal side of said tank.

10. Apparatus according to claim 7 wherein said gas dispersing means consists of a series of spaced units positioned along said opposite longitudinal side of said tank and a second series of spaced units positioned along a longitudinal axis spaced from said series of spaced units positioned along said opposite longitudinal side of said tank.

11. Apparatus according to claim 9 wherein a series of spaced units are positioned along a longitudinal axis intermediate said 2 series of spaced units.

* * * * *

PO-1050
(5/69)

UNITED STATES PATENT OFFICE
CERTIFICATE OF CORRECTION

Patent No. 3,619,421      Dated November 9, 1971

Inventor(s) Millice Floyd Hobbs, Rayburn Prettyman, John Blake, and Robert Fisher It is certified that error appears in the above-identified patent and that said Letters Patent are hereby corrected as shown below:

1. Column 3, line 61, "form" should be --from--.

2. Column 6, line 19, delete " so that when gas is being discharged, the diffusers".

3. Column 6, line 43, after "and" delete the second T of the two T's.

4. Column 7, lines 34 and 35, delete "and intermediate said area along said opposite longitudinal side".

Signed and sealed this 9th day of May 1972.

(SEAL)
Attest:

EDWARD M.FLETCHER,JR.      ROBERT GOTTSCHALK
Attesting Officer      Commissioner of Patents